United States Patent [19]
Hannah

[11] Patent Number: 5,784,581
[45] Date of Patent: Jul. 21, 1998

[54] APPARATUS AND METHOD FOR OPERATING A PERIPHERAL DEVICE AS EITHER A MASTER DEVICE OR A SLAVE DEVICE

[75] Inventor: Eric C. Hannah, Pebble Beach, Calif.

[73] Assignee: Intel Corporation, Santa Clara, Calif.

[21] Appl. No.: 642,387

[22] Filed: May 3, 1996

[51] Int. Cl.$^6$ .................................................. G06F 3/00
[52] U.S. Cl. ................................................................. 395/290
[58] Field of Search ........................................ 395/290, 308, 395/309; 380/49

[56] References Cited

U.S. PATENT DOCUMENTS

| | | | |
|---|---|---|---|
| 4,888,802 | 12/1989 | Cooney | 380/49 |
| 4,890,279 | 12/1989 | Lubarsky | 370/58.1 |
| 5,014,267 | 5/1991 | Tompkins et al. | 370/62 |
| 5,438,571 | 8/1995 | Albrecht et al. | 370/94.3 |
| 5,581,729 | 12/1996 | Nishtala | 395/470 |

OTHER PUBLICATIONS

Universal Serial Bus Specification, Version 1.0, Jan. 19, 1996.

*Primary Examiner*—Jack B. Harvey
*Assistant Examiner*—David A. Wiley
*Attorney, Agent, or Firm*—Blakely, Sokoloff, Taylor & Zafman

[57] ABSTRACT

An apparatus capable of operating as either a master device or a slave device on a communication link such as a Universal Serial Bus (USB). The apparatus includes a first communication port which is utilized when the apparatus is operating as a slave device. A second communication port is utilized when the apparatus is operating as a master device. A device controller is coupled to both the first communication port and the second communication port. The device controller enables either the first communication port or the second communication port after detecting whether an active host controller is coupled to the first communication port. A timer may be used to determine the presence or absence of an active host controller.

20 Claims, 7 Drawing Sheets

APPARATUS AND METHOD FOR OPERATING A PERIPHERAL DEVICE AS EITHER A MASTER DEVICE OR A SLAVE DEVICE

BACKGROUND OF THE INVENTION

1. Field of the Invention

The present invention relates to devices capable of operating as either a master device or a slave device on a communication link such as a Universal Serial Bus (USB).

2. Background

Various types of communication links and communication protocols are used to interconnect devices and allow interconnected devices to communicate with one another. Communication links utilize different methods for controlling the flow of instructions and data between interconnected devices. For example, one device may operate as a master of the communication link while other devices operate as slaves on the communication link. In this configuration, the master device issues commands and tokens on the communication link which permit the slave devices to communicate. If a particular slave device does not receive an appropriate command or token, then the device does not transmit on the communication link. Thus, a single master device controls the flow of commands and data on the communication link.

Another configuration provides peer-to-peer interconnections between various devices. In this configuration, the devices are not identified as either a master device or a slave device. Instead, each device is capable of issuing commands and data on the communication link without requiring "permission" from another device.

A particular system for interconnecting devices is provided by the Universal Serial Bus (USB) standard. USB is a useful system for connecting a series of peripheral devices to a computer. USB utilizes a USB host controller contained within a personal computer (PC) or other computing device. The USB host controller operates as the USB master and controls other USB slave devices connected to the USB. All data flow on the USB is controlled or monitored by the USB host controller. The USB master issues tokens and commands to the attached slave devices giving permission to transmit on the USB.

The USB specification provides for a computer (e.g., a personal computer) as the bus master, issuing tokens and commands to all slave devices. However, the USB specification does not address the issue of providing communication between USB slave devices when a USB host controller is not present or not active. Without a computer operating as a USB master, the USB specification does not provide for any type of communication between the USB slaves because the USB master is not present to issue the appropriate commands. It is therefore desirable to provide a system for permitting communication between USB slave devices connected to a USB when the computer acting as the bus master is not present or not connected to the USB.

SUMMARY OF THE INVENTION

The present invention provides a system for allowing a device, such as a Universal Serial Bus (USB) device, to have a "roaming" mode in which the device can communicate with other connected devices without requiring an active host controller. A device according to the present invention detects the absence of a host controller and enables itself as a master device communicating with other slave devices. The invention expands the usefulness of devices, for example USB devices, by permitting the devices to communicate with one another without requiring the presence of a host controller to control the communication between the devices.

One embodiment of the present invention provides an apparatus capable of operating as either a master device or a slave device on a communication link such as a USB. The apparatus includes a first communication port which is utilized when the apparatus is operating as a slave device. A second communication port is utilized when the apparatus is operating as a master device. A device controller is coupled to both the first communication port and the second communication port and enables either the first or second communication port after detecting whether an active host controller is coupled to the first communication port.

Another feature of the invention provides that the device controller enables the first communication port and disables the second communication port if an active host controller is detected.

Additionally, the device controller disables the first communication port and enables the second communication port if an active host controller is not detected.

Another feature of the invention provides a timer coupled to the device controller for use in detecting the presence or absence of an active host controller.

One aspect of the invention involves determining whether an active host controller is coupled to the device. The device is enabled as a slave device if an active host controller is detected. The device is enabled as a master device if an active host controller is not detected.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well known methods, procedures, components, and circuits have not been described in detail so as not to obscure the invention.

For illustration purposes, the invention will be described as used in a Universal Serial Bus (USB) configuration. However, those skilled in the art will appreciate that the invention is applicable to any protocol or system for interconnecting various devices. Furthermore, the invention may be utilized with all variations and extensions of USB.

The present invention is related to a system for providing a "roaming" mode to a device on a communication link such as a USB. This "roaming" mode permits the device to communicate with other devices directly, without requiring an active host controller coupled to the communication link.

Figure 1:
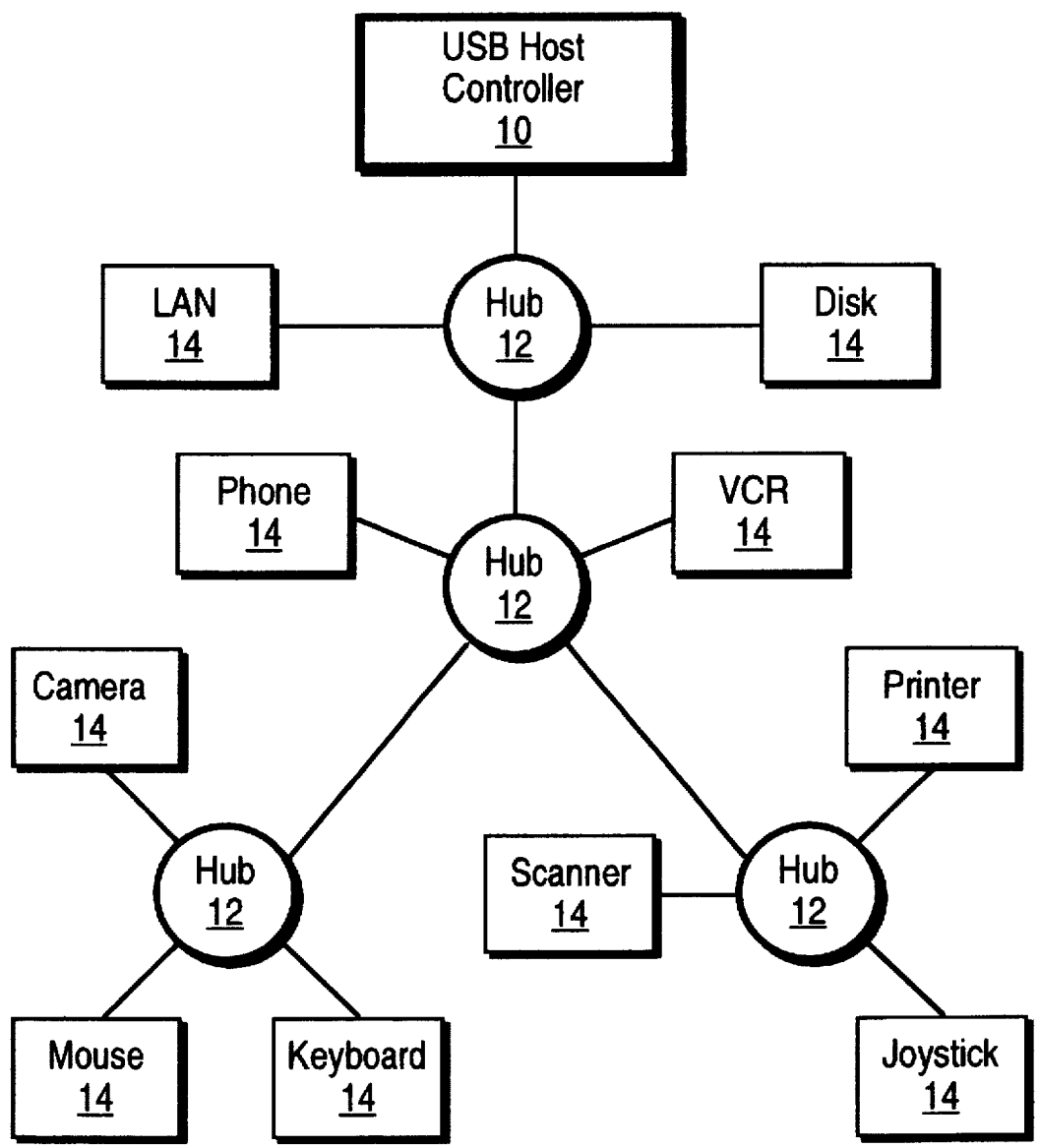
FIG. 1 illustrates the interconnection of various Universal Serial Bus (USB) devices and hubs to a USB host controller.

Referring to FIG. 1, a USB configuration is illustrated. A USB host controller 10 (e.g., a host personal computer) controls a plurality of interconnected USB devices 14 and USB hubs 12. The Universal Serial Bus standard provides a high-speed digital interconnection between the host controller 10 and the various hubs 12 and devices 14. A Universal Serial Bus is capable of replacing traditional serial, parallel, SCSI and other device interfaces on a personal computer. Instead of using a separate interface card or interface controller for each interface, USB provides having the capacity to attach numerous USB devices to a single USB port.

In a typical universal serial bus configuration, such as the configuration shown in FIG. 1, USB host controller 10 controls the operation of the USB by transmitting tokens and commands to the attached USB hubs 12 and USB peripheral devices 14. The tokens and commands issued by the host controller give permission to specific peripheral devices allowing them to transmit commands and/or data on the USB. A USB peripheral device may exchange data with the host controller directly or with another USB peripheral device connected to the USB. For example, a mouse or keyboard may generate data which is transmitted across the USB to a personal computer acting as the USB host controller. Similarly, the personal computer may transmit data across the USB to a printer or disk drive connected to the USB. In another situation, the USB host controller may control the communication of data between two USB peripheral devices. For example, a camera or camcorder may capture and transmit images across the USB to a disk drive or VCR for storage. In this example, the host controller or personal computer does not receive the image data directly, but does control the flow of data between the two peripheral devices.

The USB topology includes both "upstream" and "downstream" directions. For example, host controller 10 shown in FIG. 1 has a downstream direction which is connected to a hub 12. Host controller 10 has no upstream direction because the controller is the master of the USB. Similarly, each USB device 14 has an upstream direction, but no downstream direction because conventional USB devices are not capable of acting as a USB master. Hubs 12 have both upstream and downstream directions. A single port on each hub 12 is designated as a "privileged port" indicating the connection to the upstream device; i.e., the master device or another USB hub. The remaining ports in each hub are used to attach USB devices 14 in the downstream direction. Hubs 12 provide two different functions in the USB topology. First, the hubs consolidate data flowing into the hub from downstream USB devices, and transmit the data to the upstream device (a host controller or another hub). Additionally, each hub distributes data arriving from an upstream source to all connected downstream USB devices 14 and downstream hubs 12.

In a USB configuration, the USB host controller automatically identifies the existence of a new peripheral device or hub when it is attached to the USB. The host controller then queries the Read-Only Memory (ROM) or other storage device within the peripheral device 14 which contains identifying information such as device type, manufacturer, etc. As mentioned above, all USB control signals are generated by the host controller 10. Typical USB devices 14 are not capable of operating as USB masters, and instead operate only as USB slaves.

Figure 2A:
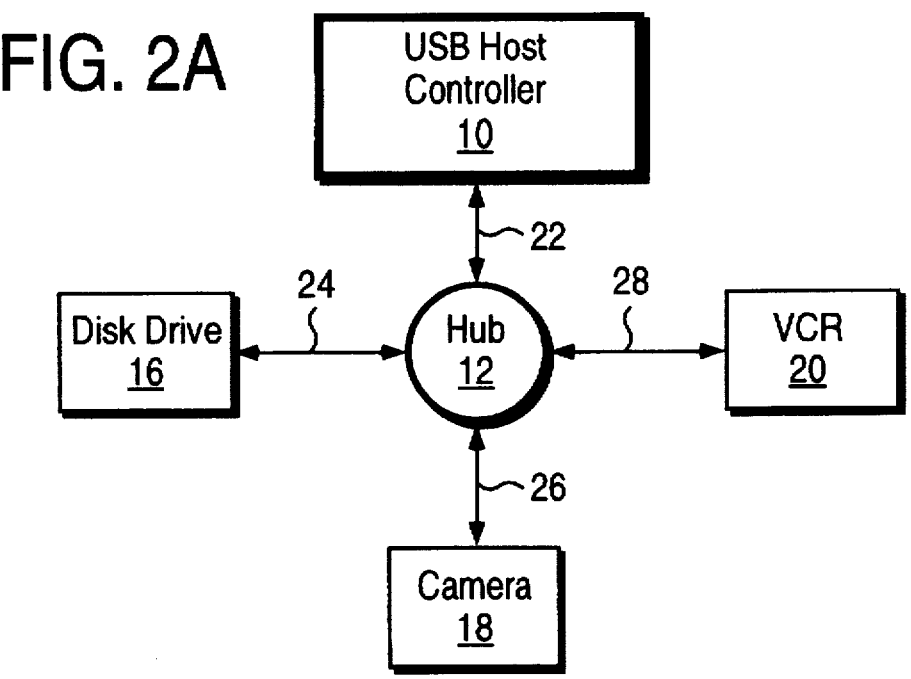
FIGS. 2A–2C illustrate particular configurations of USB devices, hubs, and USB host controllers.

The invention provides a USB device capable of operating in the normal manner (as a USB slave device) or functioning as a USB master when a host controller is not present or not active. FIG. 2A illustrates a simplified USB configuration where each peripheral device is acting as a USB slave. A USB host controller 10 is coupled to the privileged port of USB hub 12 using a communication link 22. A disk drive 16, a camera 18, and a video cassette recorder (VCR) 20 are each coupled to downstream ports of hub 12 using communication links 24, 26, and 28 respectively. The disk drive, camera, and VCR are USB peripheral devices operating as USB slaves and capable of communicating with USB host controller 10. In this configuration, USB host controller 10 controls the operation of disk drive 16, camera 18 and VCR 20 by issuing tokens and commands giving permission to the peripheral devices to use the USB. Each communication link 22-28 is a bidirectional USB connection capable of communicating the USB protocol.

In the configuration of FIG. 2A, the USB peripheral devices (16, 18, and 20) are not capable of communicating with one another without the control function provided by host controller 10. Therefore, if host controller 10 is inactive, or disconnected from hub 12, then the USB peripheral devices are not capable of communicating with one another. This configuration is a "typical" USB configuration.

Figure 2B:
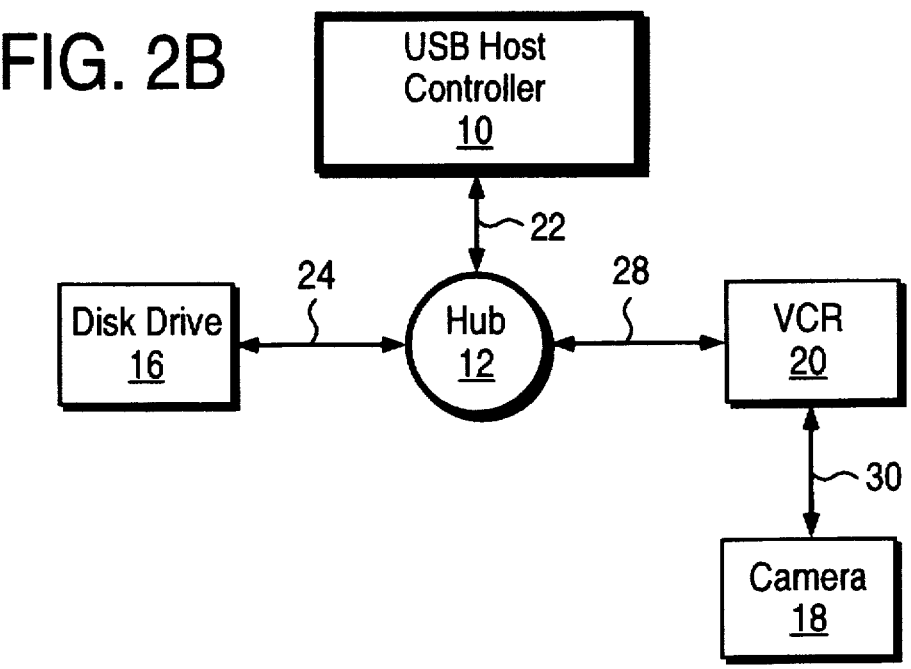

Referring to FIG. 2B, a different USB configuration is illustrated. USB host controller 10 is connected to the privileged port of hub 12 as described above with respect to FIG. 2A. Similarly, disk drive 16 and VCR 20 are connected to hub 12 as shown in FIG. 2A. However, camera 18 is no longer connected to hub 12, but instead is connected directly to VCR 20 using communication link 30. Communication link 30 is a bidirectional USB connection similar to communication links 24-28. In this configuration, camera 18 has no direct link to hub 12 or host controller 10. However, camera 18 communicates with VCR 20 using communication link 30 which is a separate USB connection communicating the USB protocol. Thus, VCR 20 has a first communication port coupled to link 28 and a second communication port coupled to link 30.

In the example of FIG. 2B, VCR 20 includes both a privileged port connected to link 28 as well as a downstream port or hub connected to link 30. Unlike a typical USB slave device, VCR 20 has both a privileged port and one or more downstream ports similar to the downstream ports of hub 12. The configuration of FIG. 2B allows camera 18 to be controlled by VCR 20, but not by host controller 10. Thus, only VCR 20 is capable of issuing tokens and commands to control the operation of camera 18. However, since VCR 20 is capable of functioning as a USB master, the VCR can control camera 18 without the presence of an active USB host controller.

Figure 2C:
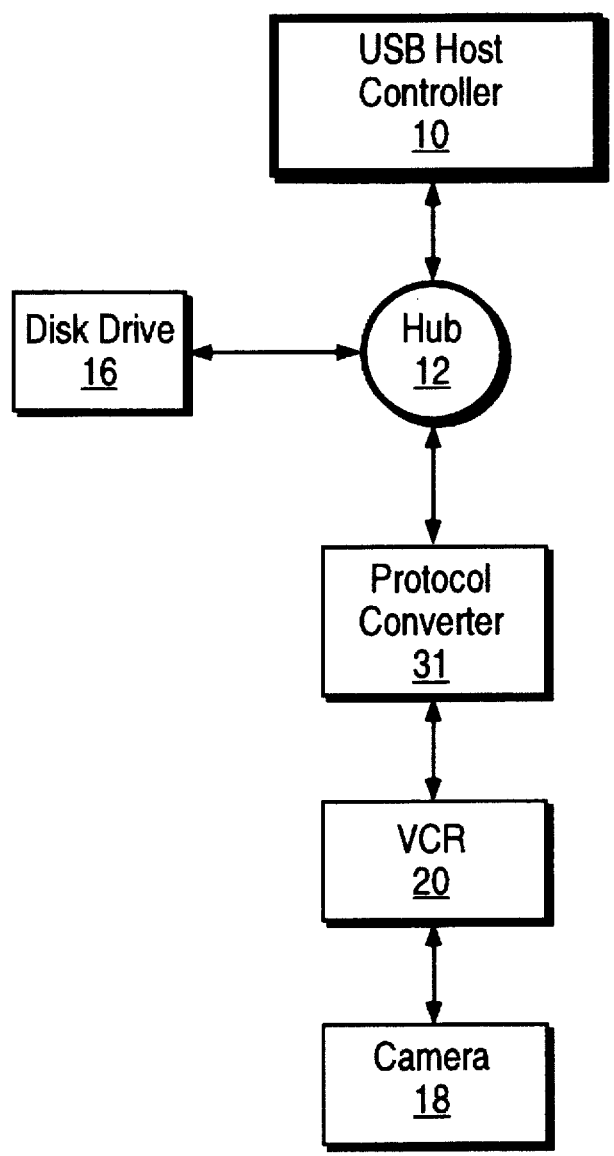

Referring to FIG. 2C, another USB configuration is illustrated. USB host controller 10 is connected to the privileged port of hub 12 and disk drive 16 is connected to a downstream port of hub 12 as described above. A protocol converter 31 is coupled between VCR 20 and a downstream port of hub 12. In this configuration, VCR 20 is not a USB device. Therefore, the use of protocol converter 31 permits VCR 20 to communicate with hub 12 and USB host controller 10 by converting USB signals to a protocol utilized by VCR 20. Protocol converter 31 may be a USB dongle used to convert the VCR's protocol to USB. The communication between VCR 20 and camera 18 may be any protocol recognized by both devices.

Figure 3:
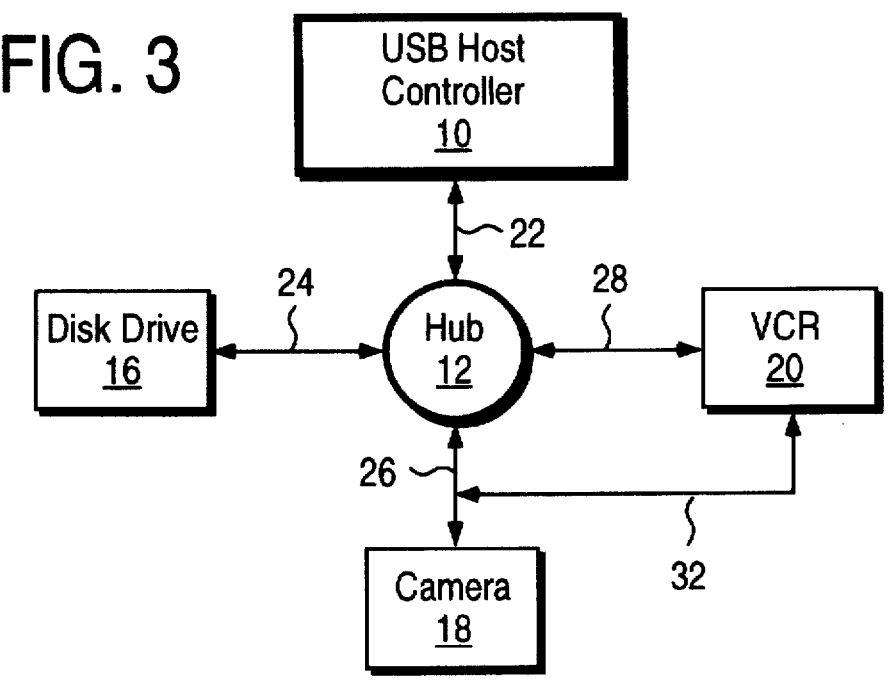
FIG. 3 illustrates another configuration of USB devices coupled to a hub and USB host controller.

FIG. 3 illustrates another USB configuration of host controller 10, hub 12, and peripheral devices 16, 18, and 20. In this configuration, camera 18 is coupled to both hub 12 and VCR 20. Thus, camera 18 may be controlled by either USB host controller 10 or VCR 20. Regardless of the controlling device, camera 18 in FIG. 3 always operates as a USB slave device. However, VCR 20 may operate as either a USB slave device or a USB master device. VCR 20 operates as a USB slave device by enabling its privileged port connected to link 28 and disabling its downstream hub coupled to link 32. VCR 20 operates as a USB master device if host controller 10 is inactive or otherwise disconnected from the USB topology. When host controller 10 is inactive, hub 12 becomes inactive due to the lack of data flow and lack of commands provided by the host controller. When host controller 10 is inactive, VCR 20 may activate its downstream hub and communicate directly with camera 18 using communication link 32. This communication does not interfere with the commands and tokens flowing on link 26 because hub 12 is inactive and, therefore, not transmitting any data or commands onto link 26.

Figure 4:
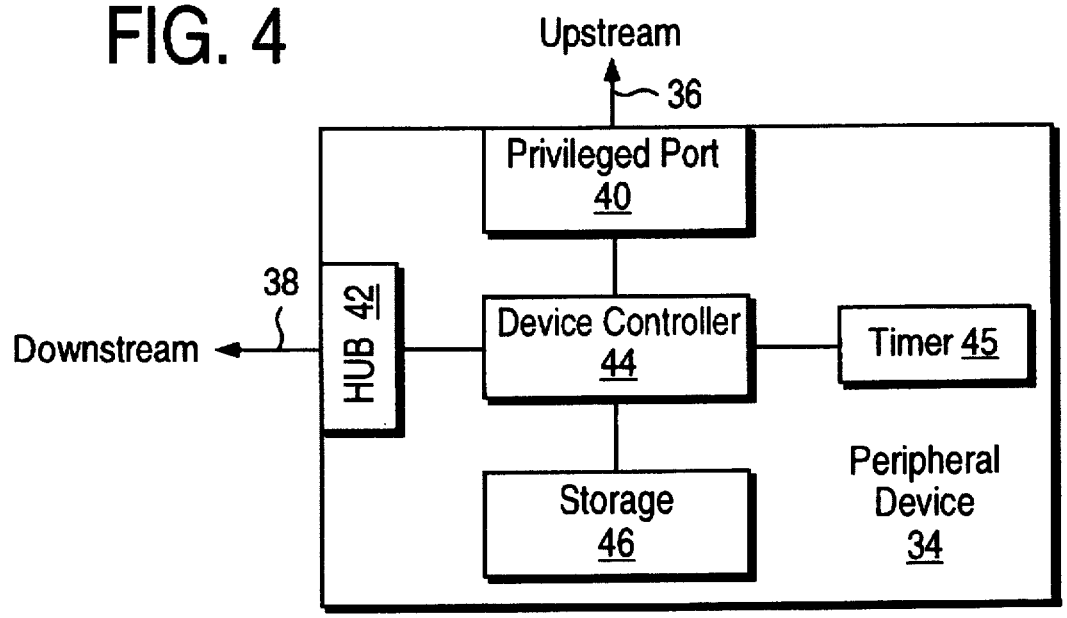
FIG. 4 is a block diagram of a USB device according to the present invention.

Referring to FIG. 4, a block diagram illustrates a USB peripheral device 34 capable of operating as either a USB master or a USB slave. Device 34 includes a privileged port 40 connected to a communication link 36 and a downstream hub 42 connected to communication link 38. Privileged port 40 may be connected to an upstream device and hub 42 may be connected to one or more downstream devices. A device controller 44 controls the operation of privileged port 40 and hub 42 as well as the flow of data through those interfaces. Device controller 44 may be any type of microcontroller or microprocessor capable of executing instructions necessary to detect the presence or absence of a host controller and communicate with downstream USB slave devices. Device controller 44 transmits and receives signals through its hub 42 when operating as a USB master device. In a USB device such as a digital camera or camcorder, an existing microcontroller within the device may be sufficient for controlling the operation of privileged port 40 and hub 42. Device controller 44 is coupled to both privileged port 40 and hub 42, and is capable of enabling either the privileged port or the hub based on the presence or absence of an active host controller communicating on link 36.

A storage device 46 is connected to device controller 44 and stores program instructions and information regarding communicating with particular types of USB slave devices. Device controller 44 must have the proper information (e.g., software or device drivers) to communicate with various types of USB slave devices. This device information may be stored in storage device 46 for retrieval at the appropriate time. Storage device 46 may be a Read-Only Memory (ROM), a flash memory, or other type of storage device. Storage device 46 may be a separate device as shown in FIG. 4, or may be integrated into device controller 44.

A timer 45 is connected to device controller 44 and operates as a watchdog timer by generating a timeout signal used to determine the presence or absence of an active host controller. Timer 45 may be a separate device as shown in FIG. 4, or may be integrated into device controller 44. Furthermore, timer 45 may be implemented in software executed by device controller 44.

Peripheral device 34 shown in FIG. 4 is connected to one or more USB slave devices through hub 42. Additionally, device 34 may be connected to a USB host controller at privileged port 40. However, device 34 will operate properly if no USB hubs or host controllers are connected to privileged port 40. In this situation, device 34 will detect the absence of an active host controller in the upstream direction and enable hub 42, thereby permitting communication with the downstream USB slave devices. When an active host controller is coupled to privileged port 40, peripheral device 34 will function properly as a USB slave device regardless of whether any USB devices are coupled to hub 42. When device 34 is operating as a USB slave, then hub 42 is disabled and disregards any USB devices connected to hub 42.

Figure 5:
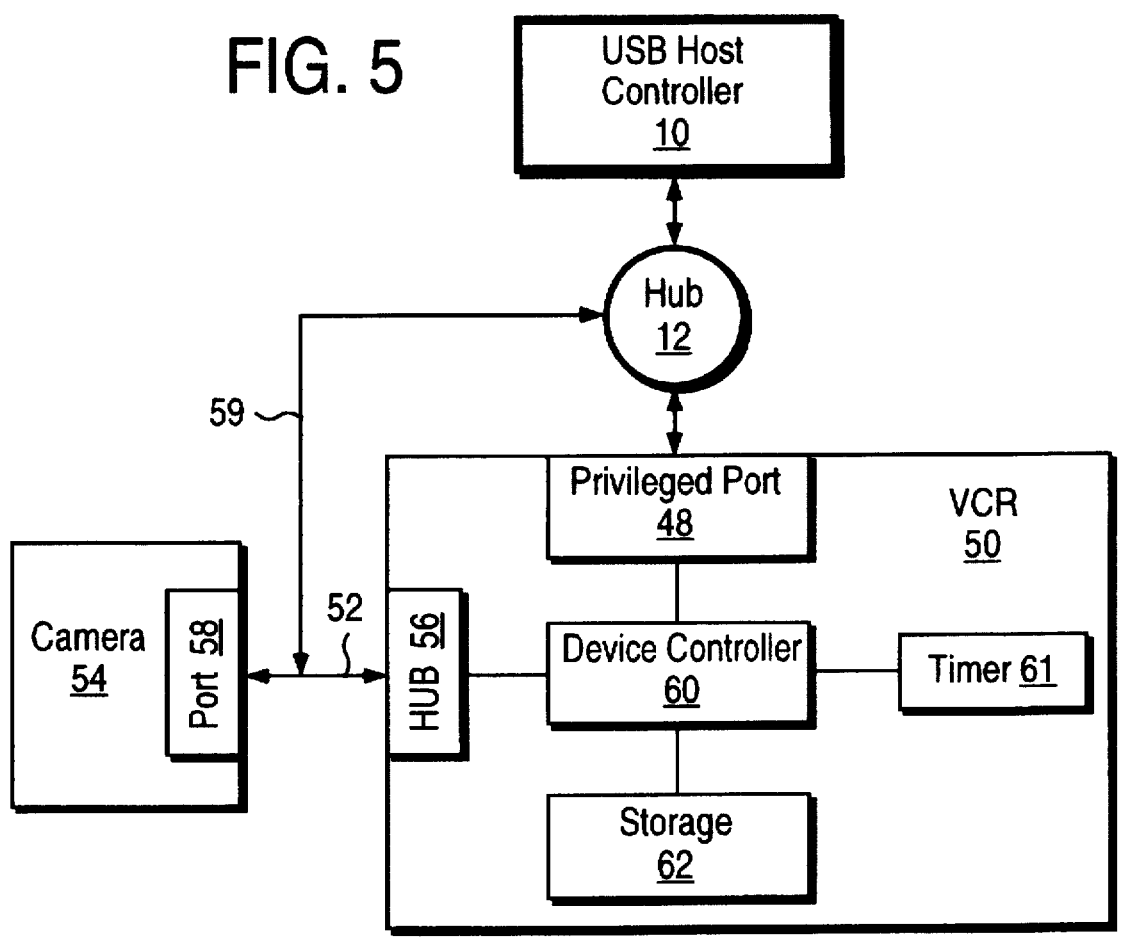
FIG. 5 illustrates the interconnections between USB devices, a hub, and a USB host controller.

Referring to FIG. 5, the interconnections between host controller 10, hub 12, a VCR 50, and a camera 54 are illustrated. USB host controller 10 and VCR 50 are connected to USB hub 12 through USB communication links. A camera 54 is connected to VCR 50 using a USB communication link 52. Communication link 52 is connected to camera 54 at a privileged port 58 and connected to VCR 50 at a hub 56. Privileged port 58 within VCR 50 is also connected to hub 12 through USB communication link 59. VCR 50 includes a device controller 60, a timer 61 and a storage device 62, all of which operate in a manner similar to that described above with respect to FIG. 4.

The configuration shown in FIG. 5 permits VCR 50 to operate as either a USB master device or a USB slave device. When host controller 10 is active and VCR 50 is coupled to the host controller through hub 12, the VCR operates as a USB slave. Device controller 60 detects the presence of host controller 10 and enables privileged port 48 and disables hub 56. Thus, the VCR does not communicate directly with camera 54 because hub 56 is disabled. However, VCR 50 may communicate with camera 54 through hub 12 and communication link 59 if instructed or permitted to do so by host controller 10.

If host controller 10 is inactive or otherwise uncoupled from privileged port 48 in VCR 50, then device controller 60 disables privileged port 48 and enables hub 56, thereby permitting VCR 50 to act as a USB master device to camera 54. VCR 50 transmits the USB protocol to camera 54 using communication link 52. In this situation, an inactive host controller 10 results in an inactive hub 12, and an inactive communication link 59. Therefore, camera 54 only communicates with VCR 50 and will not receive any conflicting signals on communication link 59.

Figure 6:
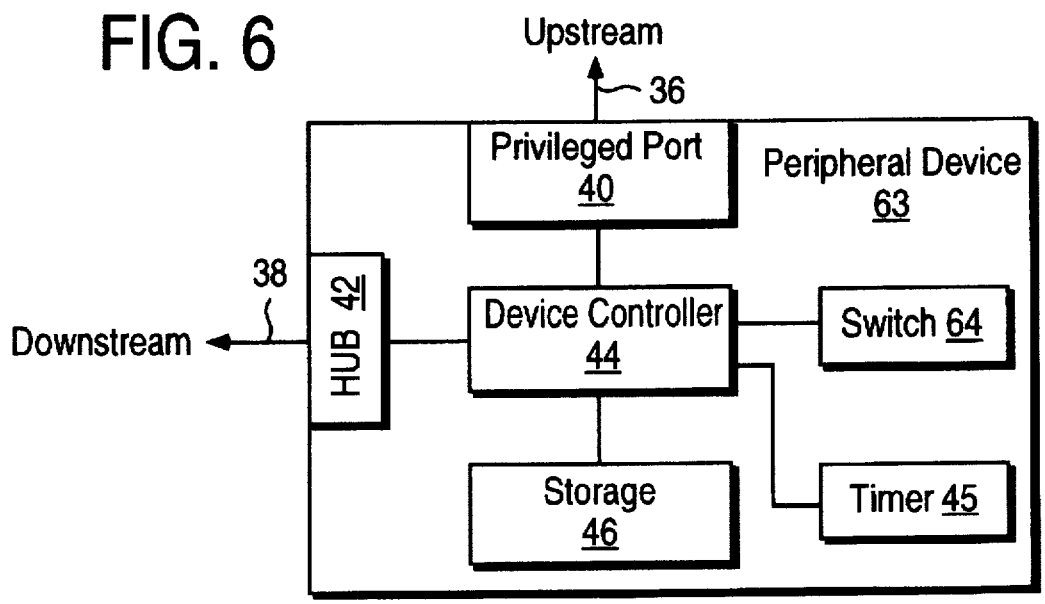
FIG. 6 is a block diagram of an alternate embodiment of the invention.

Referring to FIG. 6, an alternate embodiment of a USB peripheral device 63 is illustrated. Peripheral device 63 is similar to peripheral device 34 illustrated in FIG. 4, but device 63 includes a switch 64 connected to device controller 44. Switch 64 provides a mechanism for electrically disconnecting peripheral device 63 from upstream devices connected to privileged port 40. The activation of switch 64 causes device controller 44 to disable privileged port 40 and enable hub 42. Thus, the activation of switch 64 permits peripheral device 63 to operate as a USB master device while remaining physically connected to an active host controller. Switch 64 may be implemented using any control mechanism which provides a signal to device controller 44 to disable privileged port 40.

Figure 7:
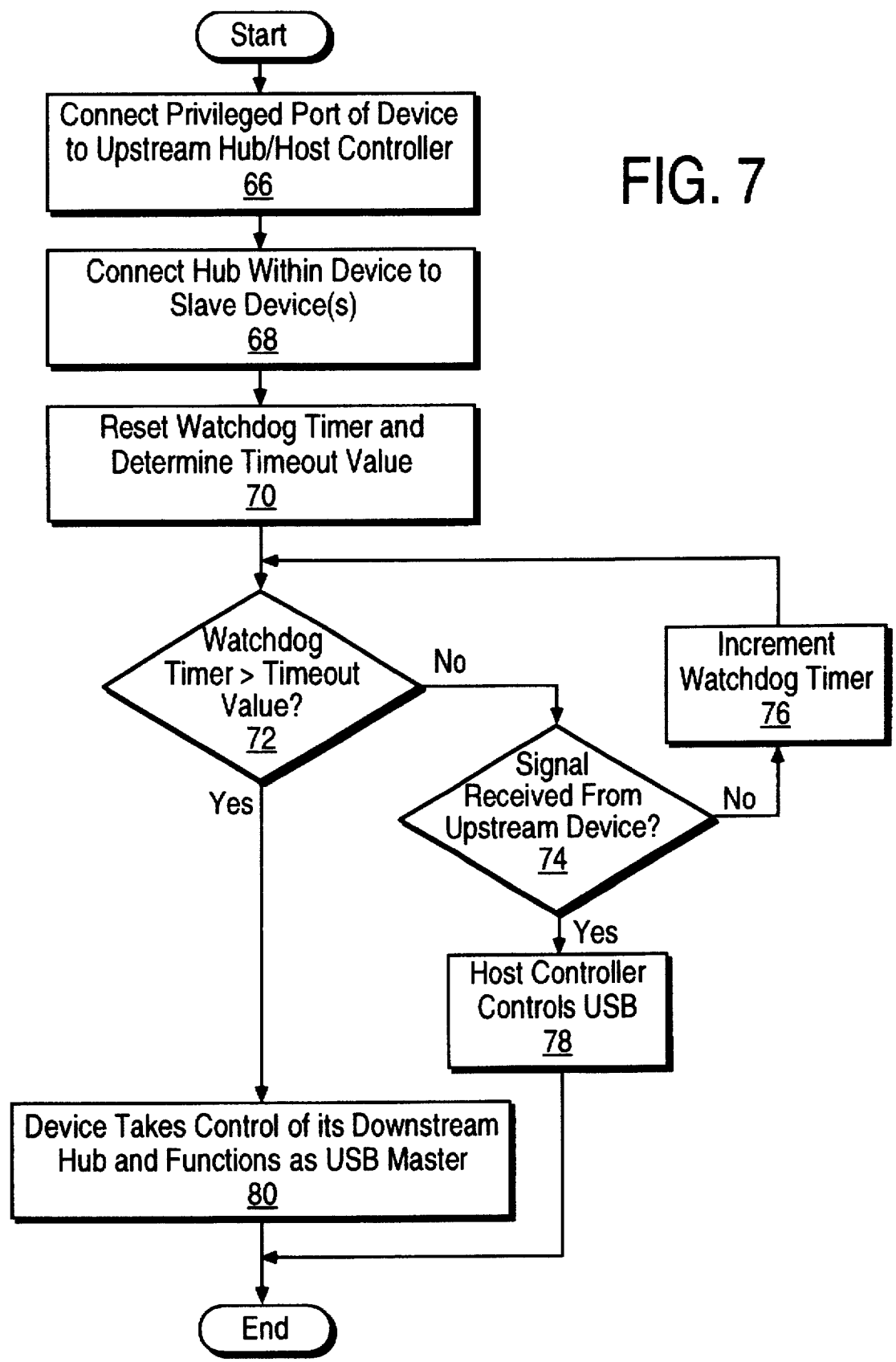
FIG. 7 is a flow diagram illustrating the procedure used when initializing a USB device or connecting a new USB device.

Referring to FIG. 7, a flow diagram illustrates the procedure used when initializing a USB peripheral device or when connecting a new USB peripheral device to an existing USB configuration. At step 66, the privileged port of the USB device is connected to an upstream hub or host controller. As shown in FIG. 5, VCR 50 is connected to hub 12 using a communication link coupled to privileged port 48. Step 66 may be performed as a result of a physically coupling the privileged port of the USB device to an upstream hub/controller, or as a result of the initialization or resetting of a USB device already coupled to an upstream hub/controller.

At step 68 in FIG. 7, the hub within the USB device may be connected to one or more slave devices. Step 68 is optional; i.e., the USB device will operate properly when no slave devices are coupled to the device's hub. Additionally, the USB device may be connected to an upstream hub or host controller initially, and connected to a slave USB device in the future. At step 70, the watchdog timer is reset and a timeout value associated with the timer is determined. The timeout value represents a time period of significant duration to ensure that an active host controller is either inactive or not coupled to the privileged port of the USB device. In one embodiment of the invention, the timeout value may be on the order of 100–200 milliseconds. The timeout value may be a default parameter stored in the USB device, or may be provided by the user of the system.

At step 72, the watchdog timer value is compared to the timeout value. If the watchdog timer is less than the timeout value, then the routine branches to step 74 to determine whether a signal has been received from an upstream hub or host controller. If no signal has been received from an upstream device, then the routine branches to step 76 where the watchdog timer is incremented, and continues to step 72 for another comparison with the timeout value. If a signal is received from an upstream device at step 74, indicating the presence of an active host controller, then control of the USB is given to the host controller and the USB device becomes a slave. Control is provided to the host controller by enabling the privileged port within the USB device and disabling the hub within the USB device.

If the watchdog timer value exceeds the timeout value at step 72, then the routine branches to step 80 where the USB device takes control of its hub and functions as a USB master. In this situation, the USB device disables its privileged port and enables its hub. Once the USB device hub is enabled, the USB device may begin transmitting USB protocol tokens and commands to one or more connected USB slave devices. Thus, the procedure illustrated in FIG. 7 waits for a predetermined time period indicated by the timeout value before allowing the USB device to begin acting as a USB master device.

As noted previously, a USB device according to the invention will operate properly if its privileged port is not coupled to a USB hub or host controller. In this situation, the watchdog timer described in FIG. 7 is not required; i.e., the USB device operates as a master to USB devices coupled to its hub and disables its privileged port.

Figure 8:
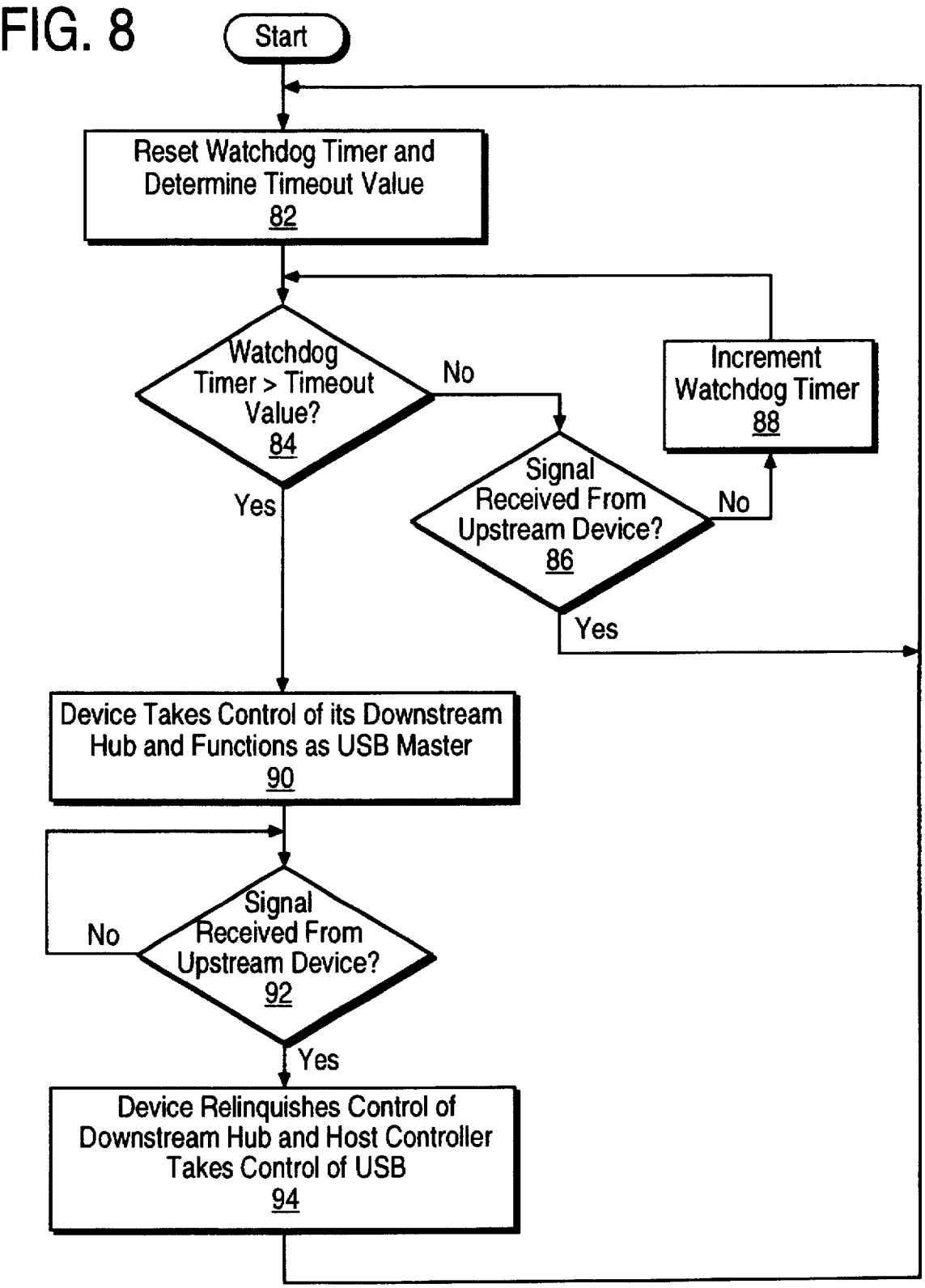
FIG. 8 is a flow diagram illustrating a procedure for detecting the presence or absence of an active host controller.

Referring to FIG. 8, a flow diagram illustrates a procedure for detecting the presence or absence of an active host controller. At step 82, a watchdog timer is reset and a timeout value is determined. At step 84, if the watchdog timer value does not exceed the timeout value then the routine branches to step 86 to determine whether a signal has been received from an upstream hub or host controller. If no signal has been received from an upstream device, then the watchdog timer is incremented at step 88 and the routine returns to step 84 for another comparison with the timeout value.

If a signal has been received from an upstream device at step 86, then the routine returns to step 82 where the watchdog timer is reset and the timeout value is again determined. Thus, each time a signal is received from an upstream device, the watchdog timer is reset. Only after the watchdog timer exceeds the timeout value at step 84 will the routine branch to step 90 where the USB device takes control of its downstream hub and functions as a USB master.

At step 92 of FIG. 8, the routine determines whether an upstream signal has been received. If no upstream signal is received, the routine branches back to step 92, thereby allowing the USB device to maintain control of its downstream hub. However, if step 92 detects a signal from an upstream device, then the USB device relinquishes control of its downstream hub and permits the upstream USB host controller to take control of the USB. When a signal is received from an upstream device, the USB device stops the operation it was performing and instructs all slave devices connected to its hub to deactivate. The USB device then enables its privileged port and disables its hub. Thus, the host controller always maintains control of the USB when active, thereby preventing a connected USB device from operating as a USB master. Only when the host controller remains inactive for a specific time, the timeout value, will the USB device be permitted to take control of its hub and function as a USB master.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. An apparatus comprising:

a first communication port utilized when said apparatus is operating as a slave device;

a second communication port utilized when said apparatus is operating as a master device; and a device controller coupled to said first communication port and said second communication port, said device controller enabling said first communication port or said second communication port in response to detection of the presence or absence of an active host controller coupled to said first communication port.

2. The apparatus of claim 1 wherein said device controller enables said first communication port and disables said second communication port if said device controller detects the presence of an active host controller coupled to said first communication port.

3. The apparatus of claim 1 wherein said device controller enables said second communication port if said device controller detects the absence of an active host controller coupled to said first communication port.

4. The apparatus of claim 3 further including a timer coupled to said device controller, said timer detecting the absence of said active host controller.

5. The apparatus of claim 3 wherein said apparatus transmits a Universal Serial Bus (USB) protocol through said second communication port to a peripheral device coupled to said second communication port.

6. The apparatus of claim 1 wherein said first and second communication ports are capable of receiving and transmitting Universal Serial Bus (USB) signals.

7. A device for use with a Universal Serial Bus (USB) comprising:
   a first communication port coupled to said USB, said first communication port adapted to communicate with a USB host controller;
   a second communication port adapted to communicate with other USB devices coupled to said device; and
   a device controller coupled to said first communication port and said second communication port, said device controller enabling said first communication port or said second communication port in response to detection of the presence or absence of an active USB host controller coupled to said first communication port.

8. The apparatus of claim 7 wherein said device controller enables said first communication port and disables said second communication port if said device controller detects the presence of an active USB host controller coupled to said first communication port.

9. The apparatus of claim 7 wherein said device controller enables said second communication port if said device controller detects the absence of an active USB host controller coupled to said first communication port.

10. The apparatus of claim 9 further including a timer coupled to said device controller, said timer detecting the absence of said active USB host controller.

11. A device adapted to be coupled to a Universal Serial Bus (USB) and capable of communicating with a USB host controller, said device comprising:
   a first USB communication port coupled to said USB host controller;
   a second USB communication port coupled to a second USB device; and
   a device controller coupled to said first USB communication port and said second USB communication port, said device controller enabling said first USB communication port or said second USB communication port in response to detection of the presence or absence of a signal from said USB host controller.

12. The device of claim 11 wherein said second communication port is a USB hub capable of communicating with a plurality of USB devices.

13. The device of claim 11 wherein said device controller enables said first USB communication port and disables said second USB communication port if signals are detected from said USB host controller.

14. The device of claim 11 wherein said device controller enables said second USB communication port and disables said first USB communication port if signals are not detected from said USB host controller for a predetermined time period.

15. The device of claim 14 further including a timer coupled to said device controller, said timer detecting the absence of signals from said USB host controller.

16. The device of claim 11 wherein said device operates as a USB master and controls said second USB device if signals are not detected from said USB host controller for a predetermined time period.

17. The device of claim 11 wherein said device is coupled to a protocol converter capable of converting Universal Serial Bus (USB) signals to a protocol utilized by said device.

18. A method for operating a USB device as either a USB master device or a USB slave device, said method comprising the steps of:
   determining whether an active host controller is coupled to said USB device;
   enabling said USB device to operate as a USB slave device if an active host controller is coupled to said USB device; and
   enabling said USB device to operate as a USB master device if an active host controller is not coupled to said USB device.

19. The method of claim 18 further including the steps of:
   measuring an elapsed time since said USB device was activated; and
   identifying an absence of an active host controller if said elapsed time exceeds a predetermined value.

20. A device for use with a Universal Serial Bus (USB) comprising:
   a communication port for communicating with a USB host controller;
   means for determining whether an active host controller is coupled to said communication port;
   means for enabling said device to operate as a USB master device if an active host controller is coupled to said communication port; and
   means for enabling said device to operate as a USB slave device if an active host controller is not coupled to said communication port.

* * * * *